(12) United States Patent
Murakami et al.

(10) Patent No.: US 10,406,681 B2
(45) Date of Patent: Sep. 10, 2019

(54) ROBOT

(71) Applicant: KAWASAKI JUKOGYO KABUSHIKI KAISHA, Kobe-shi, Hyogo (JP)

(72) Inventors: Junichi Murakami, Kobe (JP); Kenji Bando, Nishinomiya (JP); Yukio Iwasaki, Kobe (JP); Satoru Hibino, Kobe (JP); Yoshiaki Tanaka, Akashi (JP); Yasuhiko Hashimoto, Kobe (JP); Takahiro Inada, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 144 days.

(21) Appl. No.: 15/537,689

(22) PCT Filed: Dec. 26, 2014

(86) PCT No.: PCT/JP2014/006483
§ 371 (c)(1),
(2) Date: Jun. 19, 2017

(87) PCT Pub. No.: WO2016/103300
PCT Pub. Date: Jun. 30, 2016

(65) Prior Publication Data
US 2018/0015613 A1 Jan. 18, 2018

(51) Int. Cl.
*B25J 9/06* (2006.01)
*B25J 9/16* (2006.01)
(Continued)

(52) U.S. Cl.
CPC . *B25J 9/06* (2013.01); *B25J 9/16* (2013.01); *B25J 9/162* (2013.01); *B25J 9/1682* (2013.01);
(Continued)

(58) Field of Classification Search
CPC ....... B25J 9/06; B25J 9/16; B25J 9/162; B25J 9/1682; B25J 13/089; B25J 19/04
See application file for complete search history.

(56) References Cited

U.S. PATENT DOCUMENTS

| | | | |
|---|---|---|---|
| 2013/0103198 A1* | 4/2013 | Nakamoto | B25J 9/161 700/257 |
| 2014/0331807 A1* | 11/2014 | Kitahara | B25J 9/042 74/490.03 |
| 2015/0202774 A1* | 7/2015 | Blank | H01L 21/68 700/254 |

FOREIGN PATENT DOCUMENTS

| | | |
|---|---|---|
| CN | 203875649 U | 10/2014 |
| JP | H02-059291 A | 2/1990 |

(Continued)

OTHER PUBLICATIONS

Mar. 3, 2015 Search Report issued in International Patent Application No. PCT/JP2014/006483.

*Primary Examiner* — Dale Moyer
(74) *Attorney, Agent, or Firm* — Oliff PLC

(57) ABSTRACT

A robot includes: a restricting member configured to restrict a horizontal movement of a predetermined workpiece; and a workpiece moving member configured to generate an action for horizontally moving the workpiece. The controller performs a control operation of positioning the workpiece at a stop position in such a manner that: based on predetermined size information of the workpiece and preset stop position information of the workpiece, the restricting member is positioned at a predetermined restricting position included in the stop position for the workpiece, and the workpiece moving member acts on the workpiece and is moved toward the restricting position to horizontally move the workpiece; and the workpiece is brought into contact with the restricting member.

5 Claims, 7 Drawing Sheets

(51) Int. Cl.
  *B25J 13/08*    (2006.01)
  *B23P 19/04*    (2006.01)
  *B25J 15/02*    (2006.01)

(52) U.S. Cl.
  CPC ............. *B25J 13/089* (2013.01); *B23P 19/04* (2013.01); *B25J 15/02* (2013.01)

(56) References Cited

FOREIGN PATENT DOCUMENTS

| | | | | |
|---|---|---|---|---|
| JP | H07-276271 | A | 10/1995 | |
| JP | H09-319425 | A | 12/1997 | |
| JP | 2010-099784 | A | 5/2010 | |
| JP | 2010-162669 | A | 7/2010 | |
| JP | 2012-206206 | A | 10/2012 | |
| JP | 2013-099807 | A | 5/2013 | |
| JP | 2013-198955 | A | 10/2013 | |
| JP | 2014-108496 | A | 6/2014 | |
| JP | 2015-085494 | A | 5/2015 | |
| JP | 6112191 | B2 * | 4/2017 | ............. B65B 35/36 |
| WO | 2014/125627 | A1 | 8/2014 | |

* cited by examiner

ROBOT

TECHNICAL FIELD

The present invention relates to a robot.

BACKGROUND ART

An aspect has been known, in which a robot including a plurality of joints performs a series of operations of, in at least one of a plurality of work steps of a work line, receiving a workpiece having been subjected to work at an upstream side, performing work with respect to the workpiece, and sending the workpiece to a downstream side.

The robot moves based on, for example, a set position coordinate. However, if the position of the workpiece sent from the upstream side is not strict, subsequent work with respect to the workpiece cannot be appropriately performed. Especially, when a person performs the work at the upstream side and then places the workpiece at a position where the robot can receive the workpiece, the robot needs to perform position adjustment work of the workpiece.

The position adjustment of the workpiece by the robot has been performed in such a manner that: a predetermined positioning jig is provided in advance at a part of a stop position of the workpiece; and the robot holds the workpiece to, for example, bring the workpiece into contact with the positioning jig (see PTLs 1 and 2, for example).

CITATION LIST

Patent Literature

PTL 1: Japanese Laid-Open Patent Application Publication No. 2014-108496
PTL 2: Japanese Laid-Open Patent Application Publication No. 2010-162669

SUMMARY OF INVENTION

Technical Problem

However, according to the conventional aspect, when the workpiece changes or details of the work change, the position of the positioning jig also changes. Therefore, problems are that: troublesome work of changing the position of the positioning jig is required; and the change and the like of the work line cannot be flexibly performed.

An object of the present invention is to provide a robot capable of easily performing positioning of a workpiece without providing a positioning jig at a predetermined position.

Solution to Problem

A robot according to one aspect of the present invention includes: a first arm including a first hand tip and at least one joint shaft, the first hand tip being provided at a tip end of the first arm, the at least one joint shaft being provided between a base and the first hand tip; a second arm including a second hand tip and at least one joint shaft, the second hand tip being provided at a tip end of the second arm, the at least one joint shaft being provided between the base and the second hand tip; a controller configured to control the first arm and the second arm; a restricting member configured to restrict a horizontal movement of a predetermined workpiece in a state where the restricting member is provided at the first hand tip; and a workpiece moving member configured to generate an action for horizontally moving the workpiece in a state where the workpiece moving member is provided at the second hand tip, wherein the controller performs a control operation of positioning the workpiece at a stop position in such a manner that: based on predetermined size information of the workpiece and preset stop position information of the workpiece, the restricting member is positioned at a predetermined restricting position included in the stop position for the workpiece, and the workpiece moving member acts on the workpiece and is moved toward the restricting position to horizontally move the workpiece; and the workpiece is brought into contact with the restricting member.

According to the above configuration, the two arms can be independently controlled and can be controlled such that by arbitrary postures realized by bending the joints of the arms, the horizontal movement of the workpiece is restricted by the restricting member provided at the hand tip of one (first arm) of the two arms, and the workpiece is horizontally moved to the position of the restricting member by the workpiece moving member provided at the hand tip provided at the other (second arm) of the arms. With this, the positioning of the workpiece can be easily performed without providing a positioning jig at a predetermined position in advance. Since it is unnecessary to provide a positioning jig, the above configuration can easily and quickly deal with the change of the workpiece and the change of details of the work.

The first arm and the second arm may be coaxially provided at a shaft perpendicular to the base, and the first arm and the second arm may be configured to be independently rotatable about the shaft relative to the base. According to this, base portions of the two arms are provided coaxially. Therefore, by setting an origin of a robot coordinate system at this coaxial position, the two arms can be taught in the same manner.

The restricting member may include: a first perpendicular surface perpendicular to a horizontal plane in a state where the restricting member is located at the restricting position; and a second perpendicular surface perpendicular to the first perpendicular surface and the horizontal plane in a state where the restricting member is located at the restricting position. With this, the workpiece horizontally moved can be surely positioned at the stop position.

When the contact of the workpiece with any one of the first perpendicular surface and the second perpendicular surface is detected with the restricting member positioned at the restricting position, the controller may control the workpiece moving member such that the workpiece is horizontally moved in a direction perpendicular to the other of the first perpendicular surface and the second perpendicular surface to be brought into contact with the other perpendicular surface. With this, the workpiece horizontally moved can be surely positioned at the stop position.

The controller may detect the contact of the workpiece with the restricting member by a change in current or torque of a motor configured to drive the joint shaft of the first arm. With this, the contact of the workpiece with the restricting member can be detected without an additional sensor configured to detect the contact.

The above object, other objects, features, and advantages of the present invention will be made clear by the following detailed explanation of preferred embodiments with reference to the attached drawings.

Advantageous Effects of Invention

The present invention is configured as explained above and has an effect of being able to easily perform positioning of a workpiece without providing a positioning jig at a predetermined position.

DESCRIPTION OF EMBODIMENTS

Hereinafter, an embodiment of the present invention will be explained in reference to the drawings. In the following explanations and drawings, the same reference signs are used for the same or corresponding components, and a repetition of the same explanation is avoided.

Figure 1:
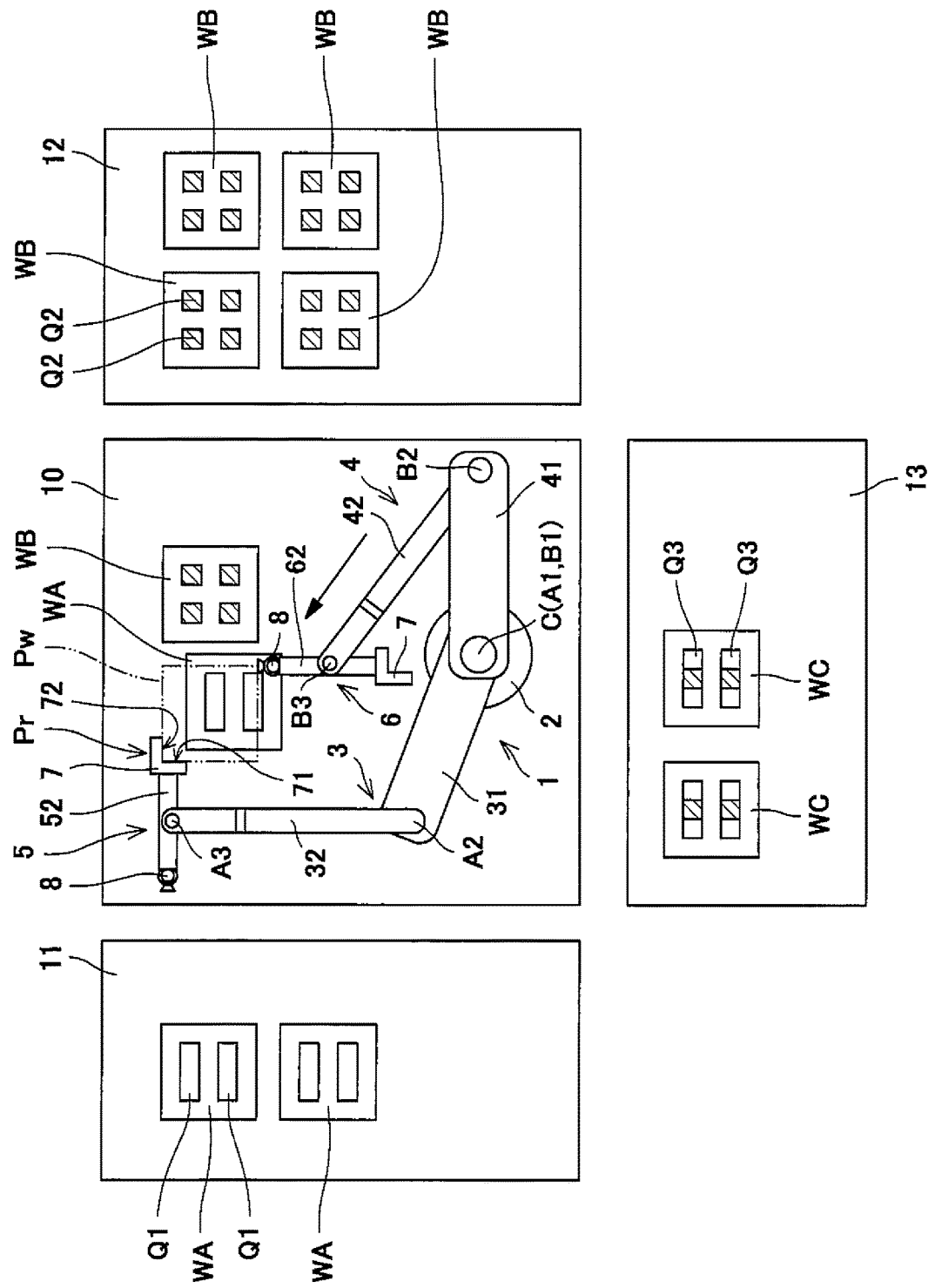
FIG. 1 is a schematic diagram showing a schematic configuration of a robot according to one embodiment of the present invention.
Figure 2:
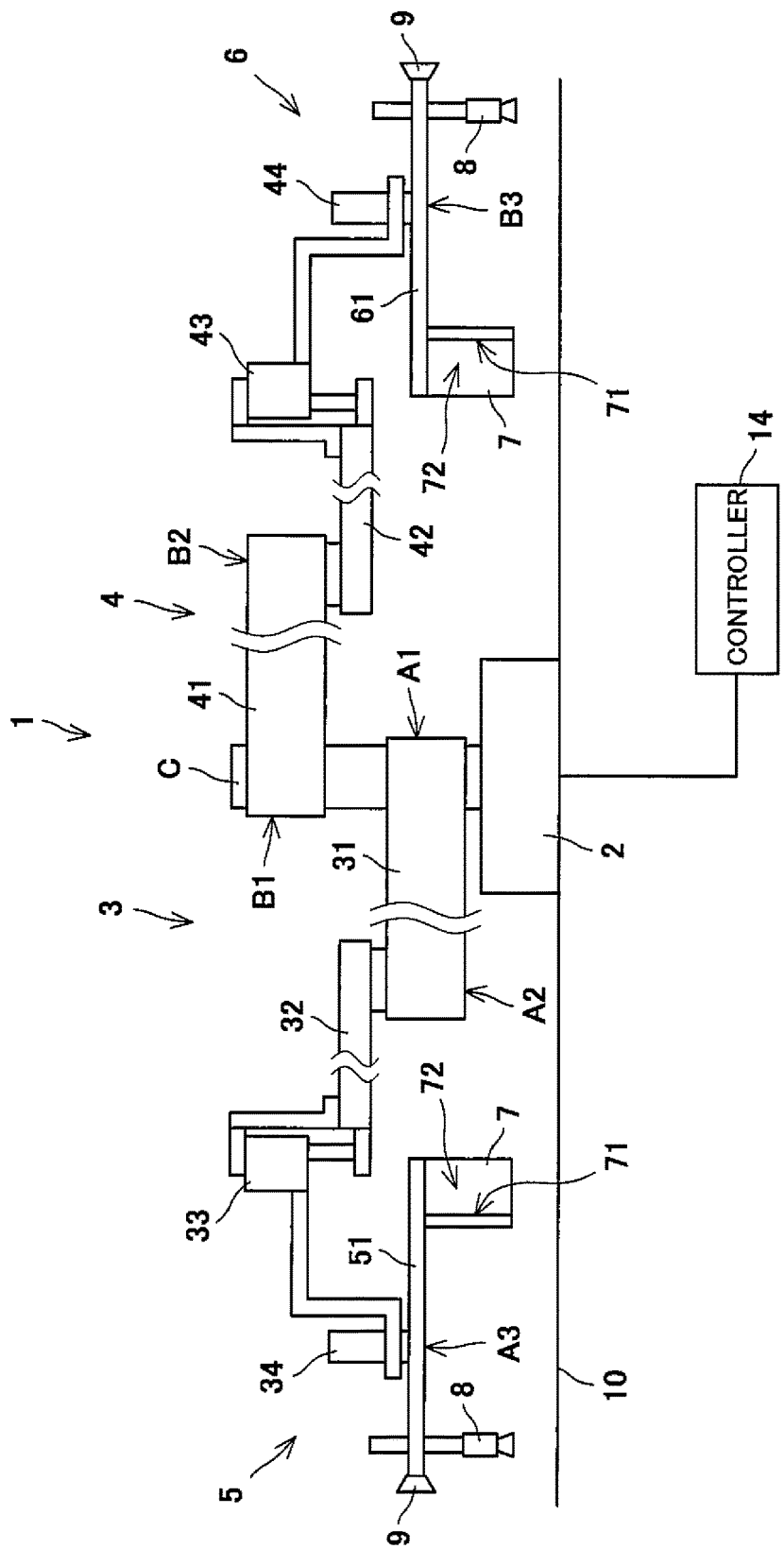
FIG. 2 is a side view of the robot shown in FIG. 1.

FIG. 1 is a schematic diagram showing a schematic configuration of a robot according to one embodiment of the present invention. FIG. 2 is a side view of the robot shown in FIG. 1. As shown in FIGS. 1 and 2, a robot 1 of the present embodiment is configured as a dual-arm robot in which two arms (a first arm 3 and a second arm 4) are provided at a base 2. The first arm 3 is provided with a first hand tip 5 at a tip end portion thereof and includes at least one joint shaft (in the present embodiment, three joint shafts A1, A2, and A3) between the base 2 and the first hand tip 5. Similarly, the second arm 4 is provided with a second hand tip 6 at a tip end portion thereof and includes at least one joint shaft (in the present embodiment, three joint shafts B1, B2, and B3) between the base 2 and the second hand tip 6. The base 2 is attached onto a worktable 10 including a horizontal upper surface on which workpieces WA and WB that are work targets are placed.

The joint shaft A1 is configured as a shaft perpendicular to an upper surface of the base 2, and the first arm 3 is configured to be rotatable about the joint shaft A1. The joint shaft B1 is also configured as a shaft perpendicular to the upper surface (horizontal plane) of the base 2, and the second arm 4 is configured to be rotatable about the joint shaft B1. The joint shaft A1 and the joint shaft B1 are provided coaxially (are configured as a rotating shaft C). The first arm 3 and the second arm 4 are configured to be independently rotatable relative to the base 2 about the rotating shaft C. Base portions of the two arms 3 and 4 are provided coaxially. Therefore, by setting an origin of a robot coordinate system at this coaxial position, the two arms 3 and 4 can be taught in the same manner.

Further, each of the joint shafts A2 and B2 is also configured as a shaft perpendicular to the horizontal plane. Therefore, as long as height positions of below-described lifting portions 33, 43 are the same as each other, tip end portions of the arms 3 and 4 move in a plane parallel to the horizontal plane. To be specific, in the present embodiment, the robot 1 is configured as a coaxial dual-arm scara robot. In the present embodiment, the arms 3 and 4 are provided such that when the height positions of the below-described lifting portions 33, 43 are the same as each other, the tip end portion of the first arm 3 and the tip end portion of the second arm 4 move in the same plane.

The first arm 3 includes: a first member 31 provided between the joint shafts A1 and A2; and a second member 32 provided between the joint shafts A2 and A3. The lifting portion 33 is provided at a tip end portion of the second member 32. The lifting portion 33 moves the first hand tip 5 in a height direction (i.e., a direction along an axis of the rotating shaft C). With this, the first hand tip 5 can move a restricting member 7 and/or a workpiece moving member 8 in the height direction. The lifting portion 33 may be a member, such as an air cylinder, which operates by pressure of air or may be a member, such as a motor, which is electrically driven. According to the lifting portion 33 driven electrically, the height of the hand tip can be finely adjusted by servo control of the motor. A driving portion 34 constituted by, for example, an electric motor for rotating the joint shaft A3 is provided at a tip end portion of the lifting portion 33.

Similarly, the second arm 4 includes: a first member 41 provided between the joint shafts B1 and B2; a second member 42 provided between the joint shaft B2 and the second hand tip 6; a lifting portion 43 configured to move the second hand tip 6 in the height direction; and a driving portion 44 configured to rotate the joint shaft B3.

The first hand tip 5 is provided with the restricting member 7 configured to restrict a horizontal movement of the predetermined workpiece WA, and the second hand tip 6 is provided with the workpiece moving member 8 configured to generate an action for horizontally moving the workpiece WA. In the present embodiment, the first hand tip 5 is also provided with the workpiece moving member 8, and the second hand tip 6 is also provided with the restricting member 7.

The first hand tip 5 includes an attachment member 51 to which the restricting member 7 and the workpiece moving member 8 are attached. The attachment member 51 is formed in a rod shape extending in a horizontal direction. A longitudinal direction middle portion of the attachment member 51 is attached to a rotating shaft (i.e., the joint shaft A3) of the driving portion 34 of the first arm 3. The restricting member 7 is attached to a first longitudinal direction end portion of the attachment member 51, and the workpiece moving member 8 is attached to a second longitudinal direction end portion of the attachment member 51. Further, a pressing member 9 is attached to the second longitudinal direction end portion of the attachment member 51. The pressing member 9 serves as a contact end in a horizontal direction pressing operation of the robot 1. The attachment member 51 is configured to be rotatable about an axis by the driving portion 34 constituted by, for example, an electric motor, the axis being perpendicular to the horizontal plane.

As with the first hand tip 5, the second hand tip 6 includes an attachment member 61 attached to an output shaft (i.e., the joint shaft B3) of the driving portion 44 of the second arm 4 so as to be rotatable. The restricting member 7 and the workpiece moving member 8 are attached to the attachment member 61.

The robot 1 includes a controller 14 configured to control the first arm 3 and the second arm 4. The controller 14 includes: a CPU, such as a microcontroller; a memory storing control programs; and the like. The controller 14 performs servo control of servo motors (not shown) to move the first hand tip 5 and the second hand tip 6 along arbitrary routes to arbitrary positions, the servo motors being configured to rotate the respective joint shafts A1, A2, A3, B1, B2, and B3 of the robot 1.

In the present embodiment, the controller 14 is set so as to be able to recognize positions of the joint shafts of the robot 1 based on: a base coordinate system that is a rectangular coordinate system whose origin is the base 2; and a tool coordinate system that is a rectangular coordinate system whose origin is the first hand tip 5 or the second hand tip 6. The robot 1 is configured such that size information about sizes of the workpieces WA and WB, position information about positions where the workpieces WA and WB are placed, stop position information about stop positions that are target positions to which the workpieces WA and WB are moved by the robot 1, and the like can be set and input to the controller 14. The set and input information is stored in the memory of the controller 14.

Hereinafter, the present embodiment will explain such a control operation of the robot 1 that the robot 1 repeatedly performs an operation of producing a workpiece WC on which parts Q3 are placed and an operation of relocating the workpiece WC to a worktable 13 located behind the robot 1, the operation of producing the workpiece WC being performed in such a manner that: one of at least one workpiece WA placed on a worktable 11 located at a left side of the robot 1 is relocated to the worktable 10 located in front of the robot 1; one of at least one workpiece WB placed on a worktable 12 located at a right side of the robot 1 is relocated to the worktable 10; positioning work of the workpieces WA and WB placed on the worktable 10 is performed; and a part Q2 placed on the workpiece WB is placed on a predetermined position of a part Q1 placed on the workpiece WA.

The controller 14 is configured to be able to switch between a control aspect (first control aspect) of causing the first arm 3 and the second arm 4 to perform the same action with respect to the same workpiece and a control aspect (second control aspect) of causing the first arm 3 and the second arm 4 to perform different actions to the same workpiece. Details will be explained below.

Figure 3:
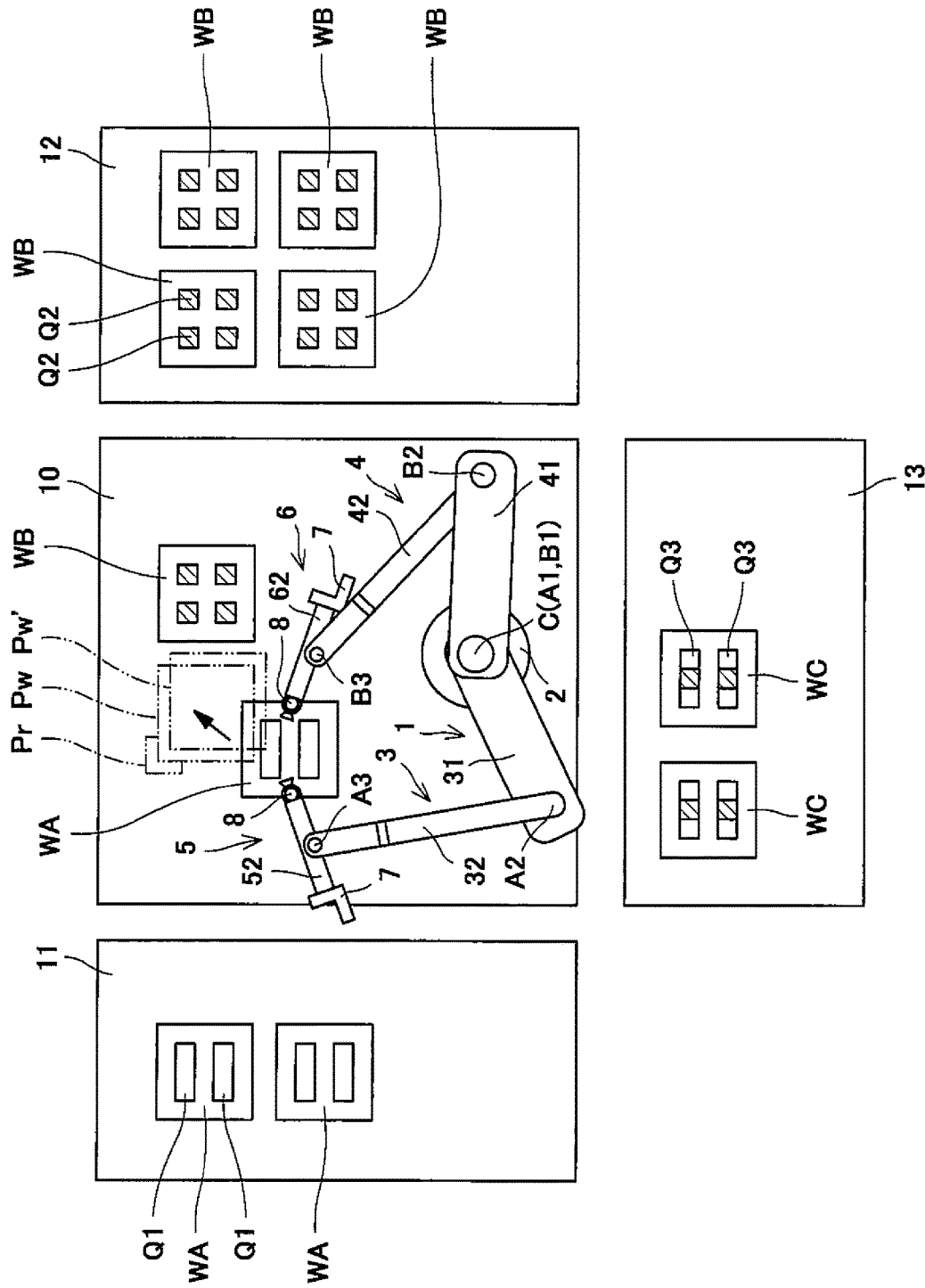
FIG. 3 is a plan view showing an example of a step in which the robot shown in FIG. 1 relocates a workpiece WA.

FIG. 3 is a plan view showing an example of a step in which the robot shown in FIG. 1 relocates the workpiece WA. In the present embodiment, the workpiece moving member 8 is constituted by a suction mechanism including a tip end (lower end) at which a suction portion is provided, the suction portion being configured to suck an upper surface of the workpiece WA to hold the workpiece WA. First, the controller 14 controls the robot 1 such that: the workpiece moving member 8 provided at the hand tip 5 of the first arm 3 and the workpiece moving member 8 provided at the hand tip 6 of the second arm 4 are positioned at predetermined positions on the upper surface of workpiece WA placed at a predetermined position on the worktable 11; and the workpiece moving members 8 are caused to suck the workpiece WA. As shown in FIG. 3, the predetermined positions (suction positions sucked by the workpiece moving members 8) on the upper surface of the workpiece WA are, for example, respective leftward/rightward direction end portions of an upward/downward direction middle portion of the workpiece WA. The controller 14 does not recognize the workpiece WA itself but stores the suction positions as coordinates on the worktable 11. The controller 14 moves the workpiece moving members 8 to the coordinates to position the workpiece moving members 8 at the suction positions on the workpiece WA.

After the workpiece moving members 8 suck the workpiece WA, the controller 14 controls the robot 1 such that as shown in FIG. 3, the workpiece WA is moved to a predetermined position on the worktable 10 with the workpiece moving members 8 sucking the workpiece WA. In this case, the controller 14 controls the robot 1 such that as the first control aspect, during the movement from the position of the workpiece WA placed on the worktable 11 to the predetermined position on the worktable 10, the workpiece moving members 8 are the same in height as each other, and a distance between the workpiece moving members 8 is constant. As above, in first control aspect, the controller 14 causes the first arm 3 and the second arm 4 to cooperate.

As described above, in the present embodiment, the robot 1 is configured as the dual-arm robot including the two arms 3 and 4. To realize the above aspect by using a plurality of robots each including one arm, a control device for interlock control of the plurality of robots is required in addition to a control device for controlling the respective robots, and an interlock condition for causing the robots to operate efficiently needs to be set. On the other hand, according to the present embodiment, the above aspect can be realized by only one dual-arm robot. Therefore, the controller 14 of the robot 1 can collectively control the two arms 3 and 4. On this account, the control is easier than the above case of cooperatively controlling the plurality of robots each including one arm.

For example, the suction positions of the workpiece moving members 8 on the workpiece WA placed on the worktable 11 may not completely coincide with the coordinates of the suction positions of the workpiece moving members 8 which coordinates are stored in the controller 14. Especially, when a worker manually places the workpiece WA on the worktable 11 (when an upstream step is performed by a person), a certain degree of positioning error occurs. As described above, the robot 1 cannot recognize an actual position of the workpiece WA as long as, for example, image recognition using a camera is not performed. Therefore, the suction positions of the workpiece moving members 8 on the workpiece WA may be displaced from assumed positions.

Therefore, in the present embodiment, as described below, the robot 1 performs the positioning of the workpiece WA after the workpiece WA is relocated to the worktable 10. To facilitate the positioning work, in the step of relocating the workpiece WA from the worktable 11 to the worktable 10, the controller 14 performs a control operation of moving the workpiece WA to a temporary stop position Pw' that is a position displaced from a predetermined stop position Pw by a predetermined distance in a direction (in the present embodiment, a right-lower direction in FIG. 3) opposite to a restricting position Pr of the restricting member 7.

For example, in a case where the actual suction positions are displaced from the assumed positions in the right-lower direction in FIG. 3, and the robot 1 performs the control operation of relocating the workpiece WA to the stop position Pw, the actual stop position is displaced from the assumed stop position Pw in a left-upper direction in FIG. 3. As described below, the restricting position Pr of the restricting member 7 is set at a left upper corner of the stop position Pw in FIG. 3. Therefore, when the workpiece WA is placed on the restricting position Pr, the restricting member 7 cannot be positioned at the restricting position Pr. On this account, in the step of relocating the workpiece WA from the worktable 11 to the worktable 10, the position on the worktable 10 at which position the workpiece WA is stopped is preset at a position away from the restricting position Pr. With this, even if the actual suction positions of the actual workpiece WA sucked by the workpiece moving members 8 are displaced from the assumed positions to some extent, the below-described positioning work can be executed without resetting the restricting position.

The robot 1 performs the step of relocating the workpiece WB from the worktable 12 to the worktable 10 in the same manner as the step of relocating the workpiece WA from the worktable 11 to the worktable 10. To be specific, the controller 14 controls the robot 1 such that: the workpiece moving member 8 of the first arm 3 and the workpiece moving member 8 of the second arm 4 are positioned at predetermined positions on an upper surface of the workpiece WB placed at a predetermined position on the worktable 12; the workpiece moving members 8 are caused to suck the workpiece WB; and the workpiece WB is moved to a predetermined position on the worktable 10 with the workpiece moving members 8 sucking the workpiece WB. The step of relocating the workpiece WB may also be performed such that: in consideration of the below-described positioning work, a temporary stop position is set with respect to the stop position of the workpiece WB; and the workpiece WB is moved to the temporary stop position.

After the workpieces WA and WB are relocated to the worktable 10, as shown in FIG. 1, the controller 14 controls the robot 1 such that the positioning work of the workpiece WA is performed using the restricting member 7 provided at the first hand tip 5 and the workpiece moving member 8 provided at the second hand tip 6. In the positioning work, as the first control aspect, the controller 14 performs a control operation of positioning the workpiece WA at the stop position Pw in such a manner that: based on the predetermined size information of the workpiece WA and the preset stop position information of the workpiece WA, the restricting member 7 of one of the arms is positioned at the predetermined restricting position Pr (see FIG. 3) included in the stop position Pw for the workpiece WA, and the workpiece moving member 8 of the other arm acts on the workpiece WA and is moved toward the restricting position Pr to horizontally move the workpiece WA; and the workpiece WA is brought into contact with the restricting member 7. As above, in the positioning work, a group of the first arm 3 and the first hand tip 5 and a group of the second arm 4 and the second hand tip 6 are independently controlled. With this, while the group of the first arm 3 and the first hand tip 5 and the group of the second arm 4 and the second hand tip 6 perform different actions with respect to the single workpiece WA, they perform cooperative operations with respect to the single workpiece WA.

Figure 4:
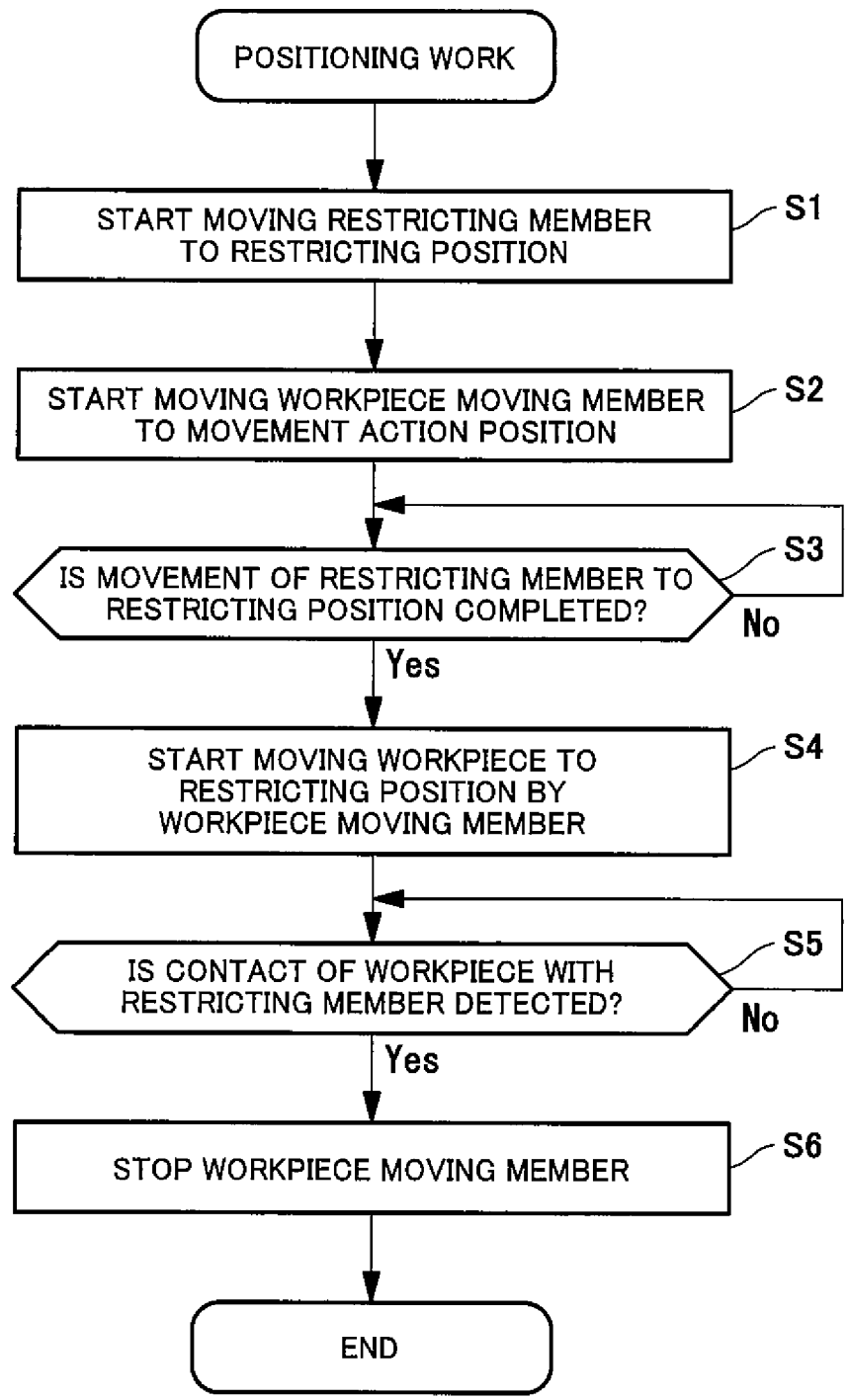
FIG. 4 is a flow chart showing a process flow of positioning work in the present embodiment.

FIG. 4 is a flow chart showing a process flow of the positioning work in the present embodiment. First, as shown in FIG. 4, in the positioning work, the controller 14 controls the first arm 3 such that the restricting member 7 of the first hand tip 5 starts moving toward the predetermined restricting position Pr included in the stop position Pw for the workpiece WA (Step S1). As described above, in the present embodiment, the restricting position Pr is provided at the left upper corner of the stop position Pw in FIG. 3. The restricting member 7 includes: a first perpendicular surface 71 perpendicular to the horizontal plane in a state where the restricting member 7 is located at the restricting position Pr; and a second perpendicular surface 72 perpendicular to the first perpendicular surface 71 and the horizontal plane in a state where the restricting member 7 is located at the restricting position Pr. To be specific, in a state where the restricting member 7 is located at the restricting position Pr, the restricting member 7 has a substantially L shape in a plan view. At the restricting position Pr, the first perpendicular surface 71 is positioned so as to overlap one side (left side) of the stop position Pw for the workpiece WA, and the second perpendicular surface 72 is positioned so as to overlap an adjacent side (upper side) of the stop position Pw for the workpiece WA.

Further, in order to cause the workpiece moving member 8 of the second hand tip 6 to act on the workpiece WA on the worktable 10 to horizontally move the workpiece WA, the controller 14 controls the second arm 4 such that the workpiece moving member 8 of the second hand tip 6 starts moving toward a predetermined movement action position (Step S2). In the present embodiment, the controller 14 controls the second arm 4 such that: the workpiece moving member 8 provided at the hand tip (second hand tip) 6 of the second arm 4 is positioned at a predetermined position on the upper surface of the workpiece WA placed at a predetermined position (the above-described temporary stop position Pw') on the worktable 10; and the workpiece moving member 8 is caused to suck the workpiece WA.

The movement action position in the present embodiment is the suction position of the workpiece moving member 8, the suction position being provided at a predetermined position on the upper surface of the workpiece WA. For example, the movement action position is a right lower end portion of the workpiece WA in FIG. 1. To be specific, the movement action position is set as coordinates of a corner portion of the temporary stop position Pw' for the workpiece WA, the corner portion being located farthest from the restricting position Pr of the restricting member 7. The controller 14 stores the movement action position as coordinates on the worktable 10 and moves the workpiece moving member 8 to the coordinates to position the workpiece moving member 8 at the movement action position.

The controller 14 determines whether or not the movement of the restricting member 7 to the restricting position Pr is completed (whether or not the restricting member 7 is positioned at the restricting position Pr) (Step S3). When it is determined that the movement of the restricting member 7 is completed (Yes in Step S3), the controller 14 controls the second arm 4 such that: the workpiece moving member 8 is caused to suck the workpiece WA; and with the workpiece moving member 8 sucking the workpiece WA, the workpiece moving member 8 horizontally moves the workpiece WA toward the restricting position Pr (Step S4). At this time, the controller 14 controls the first arm 3 such that the restricting member 7 is maintained at the restricting position Pr.

With this, the workpiece WA slides on the worktable 10 toward the restricting member 7 located at the restricting position Pr. It should be noted that the workpiece WA may be moved in a floating state from the upper surface of the worktable 10. Instead of the above aspect, the above process may be performed such that: after the movement of the restricting member 7 to the restricting position Pr is completed, the workpiece moving member 8 is moved to the movement action position; and the workpiece moving member 8 located at the movement action position horizontally moves the workpiece WA (i.e., the above process may be executed in order of Steps S1, S3, and S2).

With the restricting member 7 positioned at the restricting position Pr, the controller 14 horizontally moves the workpiece moving member 8 until the workpiece WA is brought into contact with the restricting member 7. For this purpose, the controller 14 determines whether or not the workpiece WA is brought into contact with the restricting member 7 (Step S5). Specifically, when the contact of the workpiece WA with any one of the first perpendicular surface 71 and the second perpendicular surface 72 is detected with the restricting member 7 positioned at the restricting position Pr, the controller 14 controls the workpiece moving member 8 (the second arm 4) such that the workpiece WA is horizontally moved in a direction perpendicular to the other of the first perpendicular surface 71 and the second perpendicular surface 72 to be brought into contact with the other perpendicular surface. With this, the workpiece WA moved horizontally can be surely positioned at the stop position Pw.

When the contact of the workpiece WA with the restricting member 7 is detected (Yes in Step S5), the controller 14 stops the horizontal movement of the workpiece moving member 8 (Step S6). With this, the workpiece WA is placed at the stop position Pw on the worktable 10.

According to the above configuration, the two arms 3 and 4 can be independently controlled and can be controlled such that by arbitrary postures realized by bending the joints of the arms 3 and 4, the horizontal movement of the workpiece WA is restricted by the restricting member 7 provided at the hand tip (first hand tip 5) of one (first arm 3) of the two arms 3 and 4, and the workpiece WA is horizontally moved to the restricting position Pr of the restricting member 7 by the workpiece moving member 8 provided at the hand tip (second hand tip 6) provided at the other (second arm 4) of the arms 3 and 4. With this, the positioning of the workpiece WA can be easily performed without providing a positioning jig at a predetermined position in advance. Since it is unnecessary to provide a positioning jig, the above configuration can easily and quickly deal with the change of the workpiece WA and the change of details of the work.

To perform the positioning of the workpiece WA in the horizontal direction, it is necessary to: move the workpiece WA in two directions in the horizontal plane, the two directions being perpendicular to each other (for example, in a leftward/rightward direction and an upward/downward direction in FIG. 1); and perform the positioning in the respective directions. According to the above configuration, since the two arms 3 and 4 can take the respective arbitrary postures, the restricting member 7 and the workpiece moving member 8 can be positioned at arbitrary positions in the horizontal plane (the positioning can be performed in two axial directions orthogonal to each other). Therefore, the positioning of the workpiece WA can be appropriately performed in the horizontal direction. For example, even in a case where the shape of the workpiece is not square (for example, rectangular), the positioning can be appropriately performed.

Further, by performing the positioning work, it becomes unnecessary to increase the accuracy of the positions of the workpieces WA and WB on the worktables 11 and 12. Therefore, a worker can place the workpieces WA and WB on the worktables 11 and 12. Thus, the work line where the worker and the robot 1 coexist can be easily constructed.

Further, since each of the workpieces WA and WB can be horizontally moved freely in the horizontal plane by the workpiece moving member 8, the positioning work can be appropriately performed.

The positioning work of the workpiece WB on the worktable 10 may be performed in the same manner as above. In this case, the positioning work may be performed by using the restricting member 7 provided at the second hand tip 6 and the workpiece moving member 8 provided at the first hand tip 5. Further, the positioning work of the workpiece WA may be performed by using the restricting member 7 provided at the second hand tip 6 and the workpiece moving member 8 provided at the first hand tip 5. For example, in a case where the restricting position Pr of the restricting member 7 provided at the second hand tip 6 is set at a right upper corner of the stop position Pw for the workpieces WA and WB in FIG. 1, the positioning of the workpieces WA and WB are performed by horizontally moving the workpieces WA and WB in a rightward direction and upward direction in FIG. 1. As above, since both the restricting member 7 and the workpiece moving member 8 are provided at each of the hand tips 5 and 6 of the two arms 3 and 4, directions for the positioning (i.e., directions in which the workpieces WA and WB are moved) can be set variously.

In the present embodiment, the controller 14 detects the contact of the workpiece WA with the restricting member 7 by changes in current or torque of motors configured to drive the joint shafts B1, B2, and B3 of the second arm 4. Therefore, in order to horizontally move the workpiece moving member 8, the controller 14 performs torque control of the motors configured to drive the joint shafts B1, B2, and B3 of the second arm 4. The controller 14 monitors the changes in torque of the motors, and when the torque exceeds a predetermined torque threshold value, the controller 14 determines that the workpiece WA is brought into contact with the restricting member 7. Further, based on the position of the joint shaft of the motor whose torque has exceeded the torque threshold value and the posture of the second arm 4 at this time, the controller 14 determines whether the workpiece WA is brought into contact with the first perpendicular surface 71 or second perpendicular surface 72 of the restricting member 7. With this, the contact of the workpiece WA with the restricting member 7 can be detected without an additional sensor configured to detect the contact.

In a case where the controller 14 determines that the workpiece WA is brought into contact with the first perpendicular surface 71 or the second perpendicular surface 72, the controller 14 may perform such a control operation that the position of the workpiece moving member 8 is returned by a predetermined distance in a direction perpendicular to the surface with which the workpiece WA is brought into contact. With this, the workpiece WA can be prevented from moving beyond the stop position Pw.

In addition to or instead of the detection of the changes in torque of the motors configured to drive the joint shafts B1, B2, and B3 of the second arm 4, the changes in torque of the motors configured to drive the joint shafts A1, A2, and A3 of the first arm 3 may be used for the detection of the contact.

Figure 5:
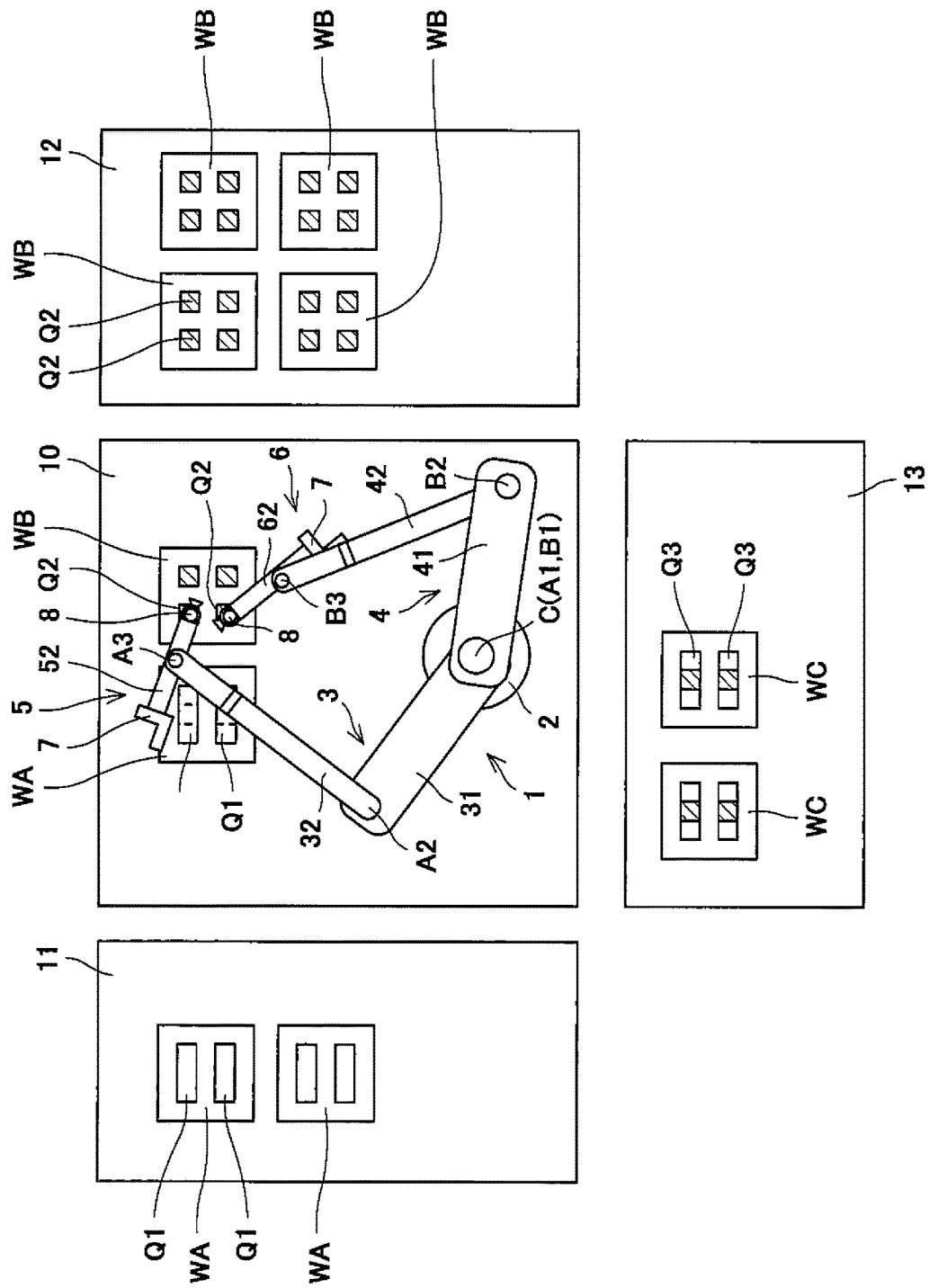
FIG. 5 is a plan view showing an example of a step in which the robot shown in FIG. 1 produces a workpiece WC.

After the positioning work of the workpieces WA and WB on the worktable 10, the controller 14 controls the robot 1 such that the workpiece WC on which the parts Q3 are placed is produced by placing the parts Q2, placed on the workpiece WB, at predetermined positions on the parts Q1 placed on the workpiece WA. FIG. 5 is a plan view showing an example of a step in which the robot shown in FIG. 1 produces the workpiece WC. In the step of producing the workpiece WC, as the second control aspect, a group of the first arm 3 and the first hand tip 5 and a group of the second arm 4 and the second hand tip 6 are independently controlled, and they perform parallel operations.

The controller 14 controls the robot 1 such that the workpiece moving members 8 suck two of a plurality of parts Q2 arranged on the workpiece WB placed on the worktable 10. Since the workpiece moving member 8 of the first hand tip 5 and the workpiece moving member 8 of the second hand tip 6 suck different parts Q2, it is preferable that the plurality of parts Q2 on the workpiece WB be arranged such that two parts Q2 forms a pair.

Then, with the workpiece moving members 8 sucking the respective parts Q2, the controller 14 controls the robot 1 such that the robot 1 relocates the parts Q2 to predetermined positions on two corresponding parts Q1 among a plurality of parts Q1 arranged on the workpiece WA placed on the worktable 10. With the parts Q2 placed at the predetermined positions on the corresponding parts Q1, the controller 14 releases the suction of the workpiece moving members 8 to the parts Q2. As above, since the two parts Q2 are attached at once by using the two arms 3 and 4, work time can be reduced.

In a case where the part Q1 on which the part Q2 is not placed remains on the workpiece WA, the same work as above is repeated. Further, in a case where the number of parts Q1 arranged on the workpiece WA is different from the number of parts Q2 arranged on the workpiece WB, the workpiece WA or WB including no original parts is relocated to the other worktable, and the new workpiece WA or WB is relocated from the worktable 11 or 12.

After the workpiece WC on which the parts Q3 are placed is produced by placing the parts Q2 on all the parts Q1 on the workpiece WA, the controller 14 controls the robot 1 such that the workpiece WC (which is originally the workpiece WA) is relocated to a predetermined position on the worktable 13 located behind the robot 1. The aspect of relocating the workpiece WC is the same as the step of relocating the workpiece WA explained using FIG. 3.

The foregoing has explained the embodiment of the present invention. However, the present invention is not limited to the above embodiment, and various improvements, changes, and modifications may be made within the scope of the present invention.

For example, the above embodiment has explained a case where the suction mechanism is used as the workpiece moving member 8, but the workpiece moving member 8 is not limited to this, and various workpiece moving members are applicable. For example, various workpiece holding structures, such as a holding mechanism configured to hold an end portion of a workpiece to move the workpiece, are applicable.

Figure 6:
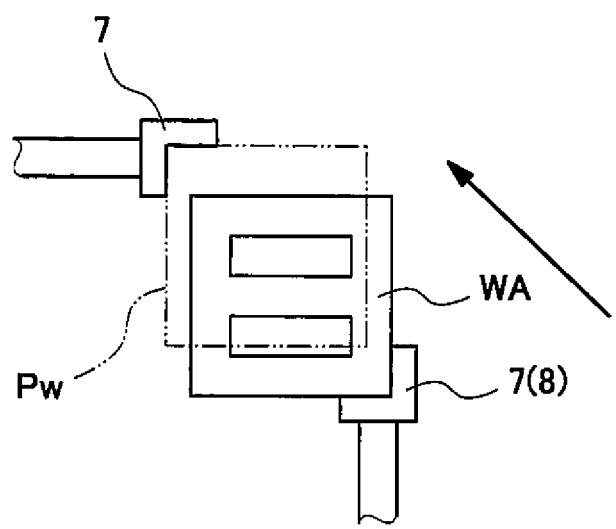
FIG. 6 is an enlarged plan view showing a modified example in which a restricting member operates as a workpiece moving member in the robot shown in FIG. 1.

The restricting member 7 provided at the hand tip which is not the hand tip at which the restricting member 7 located at the restricting position Pr is provided may serve as the workpiece moving member. FIG. 6 is an enlarged plan view showing a modified example in which the restricting member operates as the workpiece moving member in the robot shown in FIG. 1. As shown in FIG. 6, the restricting member 7 serves as the workpiece moving member 8, and the restricting member 7 pushes an end portion (corner portion) of the workpiece WA from one side to move the workpiece WA. According to this, since the workpiece moving member itself achieves an action of restricting the position of the workpiece, both sides of the workpiece can be restricted. Thus, the positioning can be performed highly accurately. Further, in this case, without detecting the contact of the workpiece WA with the restricting member 7, it is possible to detect that the workpiece WA is located at the stop position Pw in such a manner that: the restricting positions of the two restricting members 7 when the workpiece WA is located at the stop position Pw are stored in advance; and it is detected that the two restricting members 7 are located at the restricting positions. It should be noted that when using two restricting members 7, both the restricting members 7 may serve as the workpiece moving members 8. One example may be such that: two restricting members 7 are arranged with a predetermined interval therebetween so as to be located on a diagonal line of the stop position Pw of the workpiece WA and located outside the stop position Pw while sandwiching the stop position Pw; and the restricting members 7 are moved so as to narrow the interval therebetween on the diagonal line. The predetermined interval is set as such a length that the workpiece WA is placed within the predetermined interval. In this case, the restricting member 7 which has contacted the workpiece WA first out of the two restricting members 7 serves as the workpiece moving member 8. Further, any one of the two restricting members 7 may be configured in a plate shape having only one perpendicular surface.

The above embodiment has explained the scara robot (horizontal articulated robot) in which all the joint shafts of the two arms 3 and 4 are perpendicular to the horizontal plane. However, the present invention is also applicable to a robot including a plurality of arms each of which can three-dimensionally control the position of a hand tip thereof which arms are used in, for example, a six-axis articulated robot.

The above embodiment has explained that the two arms 3 and 4 are coaxially provided at the rotating shaft C. However, the two arms 3 and 4 do not necessarily have to be provided coaxially. Further, the present invention is also applicable to a robot including three or more arms.

As the aspect of detecting the contact of the workpiece WA with the restricting member 7, the above embodiment has explained the example of detecting the current or torque of the motors configured to drive the joint shafts of the arms 3 and 4. However, the above embodiment is not limited to this. For example, the contact of the workpiece WA may be detected by a contact sensor attached to a predetermined position of the restricting member 7.

The above embodiment has explained that the restricting member 7 and the workpiece moving member 8 are provided at each of the first hand tip 5 and the second hand tip 6 in advance. However, the above embodiment is not limited to this as long as the robot 1 performs the work with respect to the workpiece in a state where one or both of the restricting member 7 and the workpiece moving member 8 are provided at each of the first hand tip 5 and the second hand tip 6. For example, one or both of the restricting member 7 and the workpiece moving member 8 may be attachable to and detachable from each of the first hand tip 5 and the second hand tip 6. Further, one example may be such that: one or both of the restricting member 7 and the workpiece moving member 8 are placed at predetermined places; the robot 1 attaches one or both of the restricting member 7 and the workpiece moving member 8 to each of the hand tips 5 and 6; and the robot 1 performs the work with respect to the workpiece. The work of the robot 1 with respect to the workpiece includes the work of restricting the horizontal movement of the workpiece by the restricting member 7 and the work of generating the action for horizontally moving the workpiece by the workpiece moving member 8.

The above embodiment has explained the aspect in which the restricting member 7 has a substantially L shape in a plan view in a state where the restricting member 7 is located at the restricting position Pr. However, the shape of the restricting member 7 is not limited to this.

Figure 7A:
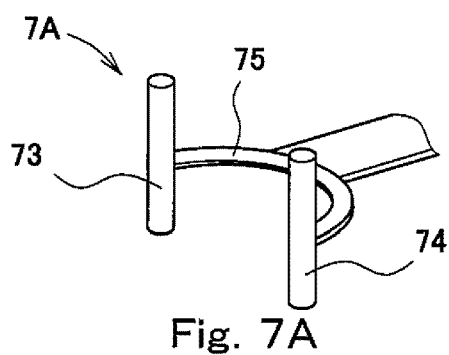
FIG. 7A is a perspective view showing the restricting member of a modified example of the present embodiment.
Figure 7B:
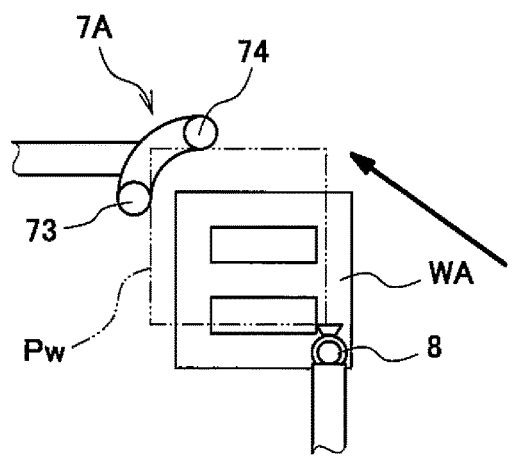
FIG. 7B is an enlarged plan view showing one example of a restriction aspect using the restricting member shown in FIG. 7A.

For example, the restricting member 7 may be constituted by a pin-shaped member. FIG. 7A is a perspective view showing the restricting member according to a modified example of the present embodiment. FIG. 7B is an enlarged plan view showing one example of a restriction aspect using the restricting member shown in FIG. 7A. In the example shown in FIG. 7A, a restricting member 7A includes: a pair of left and right pin-shaped portions 73 and 74 arranged in parallel with a predetermined interval therebetween; and a coupling portion 75 coupling the left and right pin-shaped portions 73 and 74. The coupling portion 75 is attached to the first hand tip 5. The shape of the coupling portion 75 is a U shape in the example shown in FIG. 7A but is not limited to this as long as the coupling portion 75 does not contact the workpiece. For example, in a below-described restriction aspect shown in FIG. 7C, the coupling portion 75 has such a shape as to linearly couple the pin-shaped portions 73 and 74. Further, in the example shown in FIG. 7A, the coupling portion 75 is connected to longitudinal direction middle portions of the pin-shaped portions 73 and 74. To be specific, each of the pin-shaped portions 73 and 74 extends upward and downward from the coupling portion 75. Instead of this, the coupling portion 75 may be connected to upper end portions of the pin-shaped portions 73 and 74, and the pin-shaped portions 73 and 74 may extend downward from the coupling portion 75.

As shown in FIG. 7B, the controller 14 moves and stops the restricting member 7A such that the pin-shaped portions 73 and 74 are located so as to contact two respective sides of the stop position Pw for the workpiece WA, the two sides sandwiching a corner portion of the stop position Pw. With this, when the workpiece WA is moved by the workpiece moving member 8 to be positioned at the stop position Pw, the workpiece WA is brought into contact with the pin-shaped portions 73 and 74 of the restricting member 7A. Thus, the workpiece WA can be restricted (positioned) at the stop position Pw.

Further, as with FIG. 6, the positioning of the workpiece may be performed in such a manner that: two restricting members 7A are used; and at least one of the two restricting members 7A is used as the workpiece moving member 8 and is moved toward the other restricting member 7A. Another example may be such that: one L-shaped restricting member 7 in the above embodiment and one restricting member 7A including the pin-shaped portions 73 and 74 shown in FIG. 7A are used; and at least one of these two restricting members is used as the workpiece moving member 8. Further, any one of the two restricting members 7A may be configured in a plate shape having one perpendicular surface.

Further, depending on the shape of the workpiece, the positioning of the workpiece may be performed in such a manner that: two restricting members 7A are used; and at least one of the two restricting members 7A is used as the workpiece moving member 8 and is moved away from the other restricting member 7A.

Figure 7C:
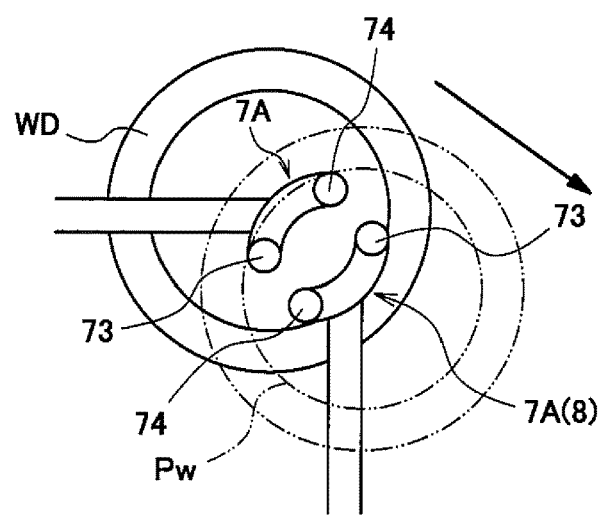
FIG. 7C is an enlarged plan view showing another example of the restriction aspect using the restricting member shown in FIG. 7A.

FIG. 7C is an enlarged plan view showing another example of the restriction aspect using the restricting member shown in FIG. 7A. FIG. 7C shows an example of an aspect of positioning a ring-shaped workpiece WD at the stop position Pw. As shown in FIG. 7C, the controller 14 performs such a control operation that one of the restricting members 7A is used as the workpiece moving member 8 and pushes an inner peripheral surface of the workpiece WD from one side to move the workpiece. Further, the controller 14 moves and stops the other restricting member 7A such that the pin-shaped portions 73 and 74 are located at such restricting positions as to contact an inner periphery of the stop position Pw for the workpiece WD. With the workpiece WD located at the stop position Pw, the positioning of the workpiece WD is performed such that four points of the inner periphery of the workpiece WD contact the pin-shaped portions 73 and 74 of the restricting members 7A.

It should be noted that the controller 14 performs such a control operation that after the pin-shaped portions 73 and 74 of the restricting member 7A serving as the workpiece moving member 8 are located in a region inside the inner periphery of the stop position Pw of the workpiece WD, the other restricting member 7A is positioned at the restricting position. To be specific, after a positional relation in which the two restricting members 7A move away from each other (a positional relation in which two hand tips 5 and 6 do not cross each other) is realized, the other restricting member 7A is positioned at the restricting position. With this, it is possible to prevent a case where the other restricting member 7A contacts an outer periphery of the workpiece WD to mistakenly restrict the movement of the workpiece WD to the stop position Pw.

The example shown in FIGS. 7A to 7C has explained a case where a pair of left and right pin-shaped portions 73 and 74 are provided. However, three or more pin-shaped portions may be provided, or depending on the shape of the workpiece, one pin-shaped portion may be provided. In the example shown in FIG. 7C, one of the two restricting members 7A may be replaced with a restricting member including one pin-shaped portion. In this case, the restricting member including one pin-shaped portion may be used as the workpiece moving member 8, or the restricting member 7A including the pin-shaped portions 73 and 74 may be used as the workpiece moving member 8. In either case, the positioning of the workpiece WD is performed such that three points of the inner periphery of the workpiece WD contact the pin-shaped portions of the two restricting members.

Further, the robot 1 may be configure such that: plural types of restricting members 7 and/or plural types of workpiece moving members 8 are attachable to the corresponding hand tips 5 and 6. The selection and replacement of the plural types of restricting members 7 and/or the plural types of workpiece moving members 8 may be performed by a person or the robot 1 itself as described above.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The robot of the present invention is useful to easily perform the positioning of a workpiece without providing a positioning jig at a predetermined position.

REFERENCE SIGNS LIST 1 robot
2 base
3 first arm
4 second arm 5 first hand tip
6 second hand tip
7, 7A restricting member
8 workpiece moving member
14 controller
71 first perpendicular surface
72 second perpendicular surface
C rotating shaft (shaft perpendicular to base)
WA, WB, WC, WD workpiece

The invention claimed is:

1. A robot comprising:
a first arm including a first hand tip and at least one joint shaft, the first hand tip being provided at a tip end of the first arm, the at least one joint shaft being provided between a base and the first hand tip;
a second arm including a second hand tip and at least one joint shaft, the second hand tip being provided at a tip end of the second arm, the at least one joint shaft being provided between the base and the second hand tip;
a controller configured to control the first arm and the second arm;
a restricting member including a contact surface configured to restrict a horizontal movement of a predetermined workpiece in a state where the restricting member is provided at the first hand tip; and
a workpiece moving member including a contact portion configured to, in a state where the workpiece moving member is provided at the second hand tip, contact the workpiece to horizontally move the workpiece on a worktable by a horizontal movement of the second arm, wherein
in order to perform positioning work of the workpiece on the worktable, the controller performs a control operation of positioning the workpiece at a stop position on the worktable in such a manner that: based on predetermined size information of the workpiece and preset stop position information regarding the stop position on the worktable, the restricting member is positioned at a predetermined restricting position on the worktable, the restricting position being included in the stop position for the workpiece, and the workpiece moving member is brought into contact with the workpiece and is moved toward the restricting position to horizontally move the workpiece on the worktable; and the workpiece is brought into contact with the restricting member.

2. The robot according to claim 1, wherein:
the first arm and the second arm are coaxially provided at a shaft perpendicular to the base; and
the first arm and the second arm are configured to be independently rotatable about the shaft relative to the base.

3. The robot according to claim 1, wherein the restricting member includes:
a first perpendicular surface perpendicular to a horizontal plane in a state where the restricting member is located at the restricting position; and
a second perpendicular surface perpendicular to the first perpendicular surface and the horizontal plane in a state where the restricting member is located at the restricting position.

4. The robot according to claim 3, wherein when the contact of the workpiece with any one of the first perpendicular surface and the second perpendicular surface is detected with the restricting member positioned at the restricting position, the controller controls the workpiece moving member such that the workpiece is horizontally moved in a direction perpendicular to the other of the first perpendicular surface and the second perpendicular surface to be brought into contact with the other perpendicular surface.

5. The robot according to claim 1, wherein the controller detects the contact of the workpiece with the restricting member by a change in current or torque of a motor configured to drive the joint shaft of at least one of the first arm and the second arm.

* * * * *